US011847799B2

(12) United States Patent
Yang et al.

(10) Patent No.: US 11,847,799 B2
(45) Date of Patent: Dec. 19, 2023

(54) COLOR MATCHING SYSTEM FOR PRODUCT MANUFACTURING

(71) Applicant: Logitech Europe S.A., Lausanne (CH)

(72) Inventors: Peng-Jian Yang, Hsinchu (TW); Shang-Yu Yu, Hsinchu (TW); Yi-Hsieh Wang, Hsinchu (TW); Ko Chun Lin, Hsinchu (TW); Zhaoyan Han, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/682,421

(22) Filed: Feb. 28, 2022

(65) Prior Publication Data

US 2023/0274463 A1   Aug. 31, 2023

(51) Int. Cl.
| | |
|---|---|
| *G06T 7/90* | (2017.01) |
| *G06V 10/56* | (2022.01) |
| *G01J 3/46* | (2006.01) |
| *G06V 10/75* | (2022.01) |
| *G01J 3/02* | (2006.01) |

(52) U.S. Cl.
CPC .............. *G06T 7/90* (2017.01); *G01J 3/0291* (2013.01); *G01J 3/462* (2013.01); *G01J 3/465* (2013.01); *G06V 10/56* (2022.01); *G06V 10/751* (2022.01)

(58) Field of Classification Search
USPC ................................................ 382/141, 162
See application file for complete search history.

(56) References Cited

U.S. PATENT DOCUMENTS

| | | | | |
|---|---|---|---|---|
| 7,614,563 | B1 * | 11/2009 | Nunnink | G06K 7/10732 |
| | | | | 235/473 |
| 8,897,553 | B2 * | 11/2014 | Lee | G06F 16/785 |
| | | | | 382/165 |
| 9,958,265 | B2 * | 5/2018 | Nagai | G01N 21/8422 |
| 11,115,566 | B2 * | 9/2021 | Nunnink | H04N 5/2252 |
| 2012/0092670 | A1 * | 4/2012 | Chatow | G01J 3/501 |
| | | | | 356/402 |
| 2015/0260625 | A1 * | 9/2015 | Rees | G01L 1/146 |
| | | | | 73/12.01 |
| 2016/0131524 | A1 | 5/2016 | Arenhold et al. | |
| 2016/0300107 | A1 * | 10/2016 | Callegari | G06T 7/38 |
| 2018/0252584 | A1 | 9/2018 | Yamanoi et al. | |
| 2018/0357793 | A1 | 12/2018 | Boes et al. | |
| 2019/0154508 | A1 | 5/2019 | Aomatsu et al. | |
| 2020/0064194 | A1 | 2/2020 | Dauga et al. | |
| 2022/0215522 | A1 * | 7/2022 | Vorobieva | G06F 18/217 |

FOREIGN PATENT DOCUMENTS

EP           0652431 A1 *  5/1995  .......... B07C 5/3422

* cited by examiner

*Primary Examiner* — Ishrat I Sherali
(74) *Attorney, Agent, or Firm* — KILPATRICK TOWNSEND & STOCKTON LLP

(57) ABSTRACT

Automation of the comparison of the colors of small surfaces of products. In one embodiment, color differences are measured rather than an absolute color value. An apparatus is provided for capturing color images of a portion of a product or part to provide a sample product image. The sample image is compared to an image of a standard product obtained under the same conditions with the same apparatus. The color difference is measured to determine when it is in a predetermined range.

20 Claims, 7 Drawing Sheets

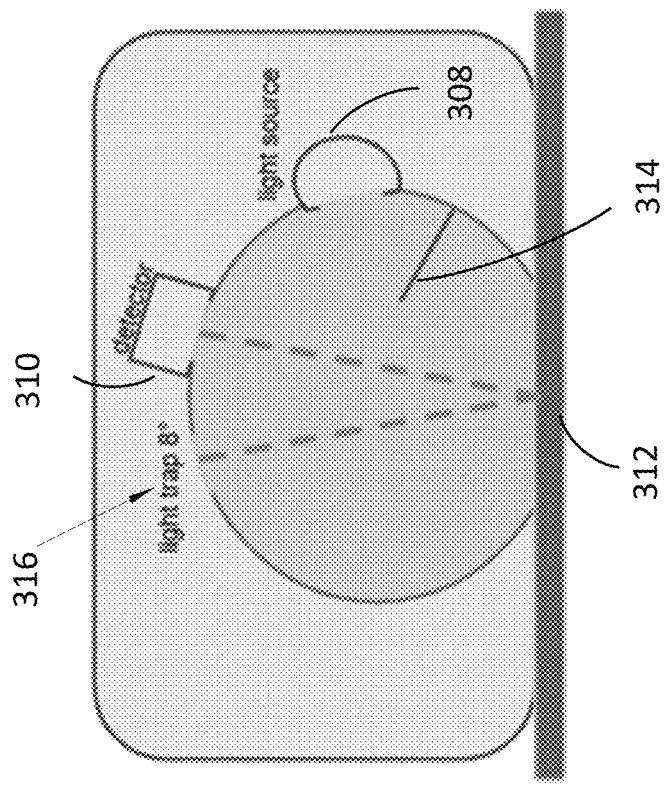
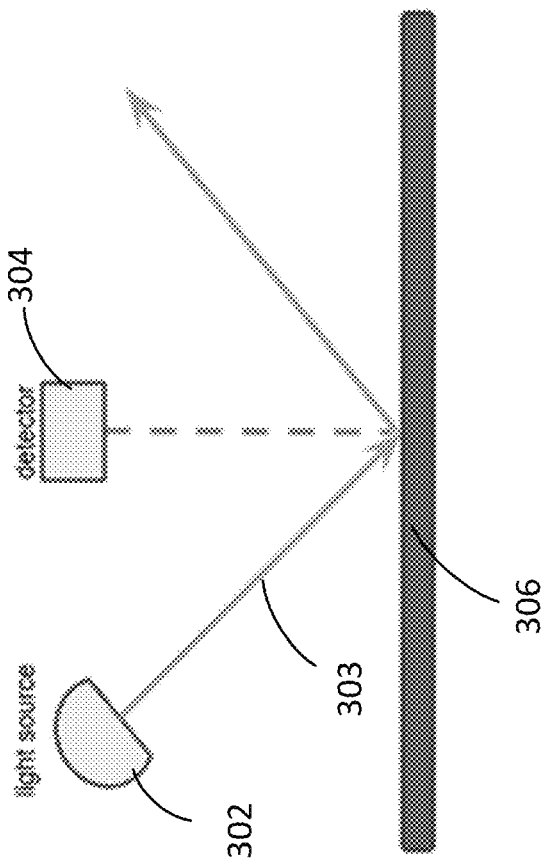
FIG. 3B
Prior Art
FIG. 3A
Prior Art

COLOR MATCHING SYSTEM FOR PRODUCT MANUFACTURING

BACKGROUND

The present invention relates generally to apparatus and methods for comparing color images, and in particular to comparing the colors of three-dimensional products.

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

During product manufacturing, it is desirable to control the color of a product (including product parts). For example, the color of plastic parts may change due to temperature changes, stress effects, etc. when injected molded or otherwise shaped. A common practice is to retain a standard-setting product, and compare samples from future manufacturing runs to the standard to see when the color is sufficiently close. This is often done using the eyes of a factory worker to assess the colors.

An alternate to human visual inspection is a colorimeter. A typical type is a sphere spectrophotometer. Sphere spectrophotometers emit light onto the surface being measured, and subsequently measure the intensity of light lost at different wavelengths. High accuracy can be achieved if light is not lost to any other factors other than the intensity absorbed by the surface being measured. A crucial component of these spectrometers is the integrating spheres, which are spherical shaped inner surfaces coated with light scattering materials to provide high reflectance and scatter the measurement light uniformly. This allows the instrument to diffusely illuminate the sample and spatially integrate the radiant flux. Sphere spectrophotometers can be used to set color standards by measuring and documenting standard color chips, which engineers and manufacturing partners can regularly reference for visual comparison for quality control. However, many surfaces are too small to fill the measurement hole on the integrating spheres, causing light leaks and inaccurate measurements. This includes curved surfaces and flat surfaces that are too small, such as letters, logos, and patterns on a part.

Current colorimeters are typically used on only to flat surfaces of a single color, and the surface must be sufficiently large. 3D shaped products (or parts) are manufactured using the 2D flat reference color chips. Color quality control of manufactured parts or products rely on the ability of inspectors' eyes to control color quality.

Accurately matching color between the samples, which can be curved and/or textured, and the standard flat color chips, is subjective. The common current method is cumbersome and subjective: individual engineers visually approve "limit samples" that define the "upper" and "lower" acceptable (predetermined) limits of color variation. Manufacturing partners then reference these limit samples for quality control during product development and mass production. Consequently, a large number of limit samples are produced, which need to be documented and maintained.

BRIEF SUMMARY

Techniques disclosed herein relate generally to apparatus and methods for automating the comparison of the colors of non-flat products. In one embodiment, color differences are measured rather than an absolute color value. An apparatus is provided for capturing color images of a portion of a product (or part) to provide a first (e.g., standard) product image. The first image is compared to an image of a second (e.g., sample) product obtained under the same conditions with the same apparatus. The color difference is measured to determine when it is in an acceptable, predetermined range.

In some embodiments, a closed container is provided which minimizes external light (e.g., reduces external light by at least 90 percent). A fixture is mounted in the container and configured to position the standard product and subsequently the sample product at the same orientation and height. A camera is mounted above the fixture. A planar light source is mounted between the camera and the fixture for projecting light in a plane normal to a line between the camera and the sample product, to avoid specular reflections into the camera. A software program compares an image of the standard product to an image of the sample product to determine when the color of the sample product is within an acceptable, predetermined range of the color of the standard product.

In some embodiments, the planar light source has an interior window for allowing the camera to view the sample product, and light sources mounted in a perimeter frame that project light laterally into the window. In one embodiment, the planar light source is a square with LEDs mounted in the perimeter facing inward toward a transparent acrylic plate. The light panel also has a built-in layer that reduces specular reflection. In embodiments, the internal surface of the container minimizes internal light reflectance.

In one embodiment, the image is cropped to the same small area of the sample and standard products. To reduce the required processing, only a portion of the pixels in the cropped area are compared. The portion of pixels can be selected by a random algorithm, a pseudo-random algorithm, or a fixed pattern such as simply skipping every other or every Nth pixel. In one embodiment, outlier pixels are eliminated if they are beyond thresholds set by a user.

In one embodiment, the colors of the sampled pixels are used to create a distribution of the count of pixels at each color difference, for each channel of the RGB colors or other color spaces. The histograms of the standard and sample are compared statistically to generate a difference value, which is then compared to an acceptable range. In one embodiment, the colors of the sampled pixels represented in sensor intensity values are used to create the distributions upon which the statistical comparisons are made. The RGB color space has integer values while the sensor intensity values (raw data) are positive real numbers, or zero.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 3A & 3B are diagrams of prior art colorimeters;

Throughout the drawings, it should be noted that like reference numbers are typically used to depict the same or similar elements, features, and structures.

DETAILED DESCRIPTION

Aspects of the present disclosure relate generally to apparatus and methods for comparing color images, and in particular to comparing the colors of products (e.g., 3D products, fabrics, fabrics made with threads of multiple colors, prints/patterns on 2D products, etc.). As used herein, a product also encompasses product parts, such as a product housing, and different materials, such as plastics, fabrics, rubber compounds, etc.

In the following description, various examples of devices and methods comparing product colors are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to apparatus and methods for automating the comparison of the colors of non-flat products and flat products that are too small to be measured by colorimeters (e.g., prints, logos, patterns). In one embodiment, color differences are measured rather than an absolute color value. A dark container 102 shown in FIG. 1 is used to capture color images of a portion of a standard and sample product for comparison.

Figure 5:
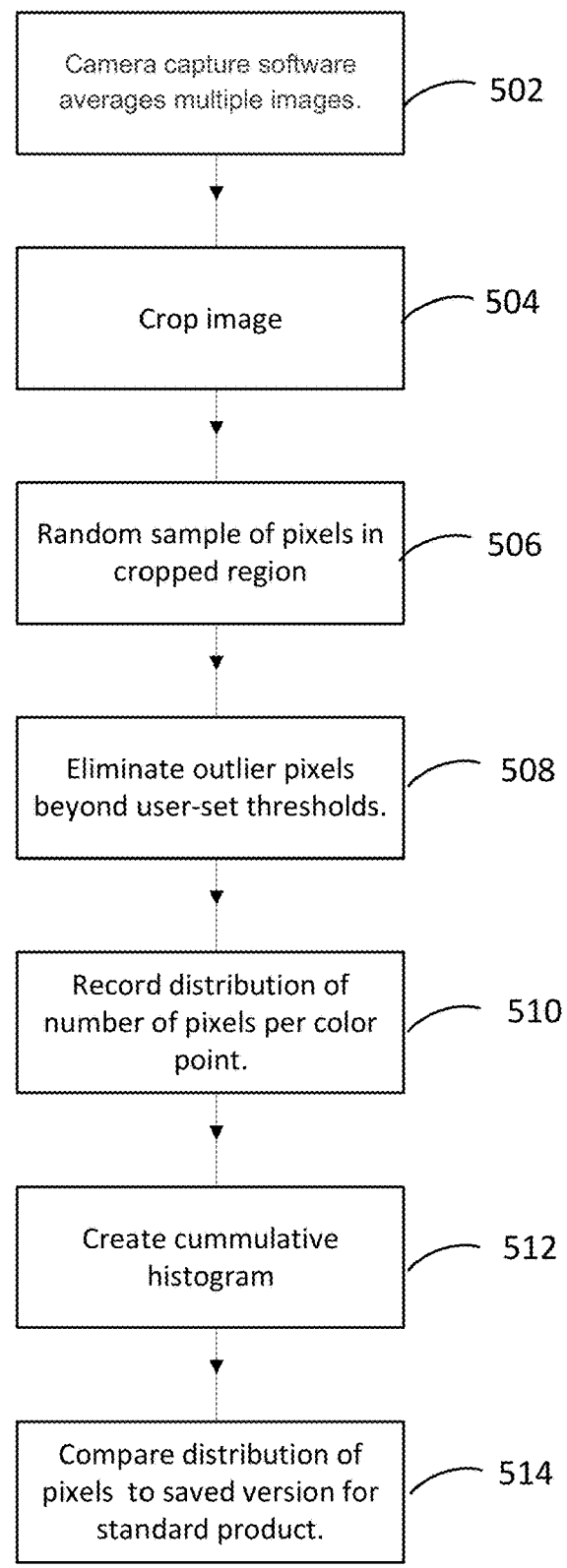
FIG. 5 is a flow chart of illustrating the operation of the apparatus of FIG. 1, according to embodiments.

The product is supported on a fixing plate 106 on a height adjustable stand 104 below a planar light 108 with an interior window. A camera 112 above the planar light captures the color images through the interior window. A software program compares the images, as illustrated in the process of FIG. 5. The program first reduces noise and reduces the amount of processing required by first cropping the image, then selecting a subset of the pixels (e.g., a random sample), then eliminating outlier colors with thresholds established by a user. The colors of the pixels of the sample and standard product are then compared, in one embodiment by using the statistical difference, quantified with a nonparametric statistical test, between the distributions of pixel colors. The statistical difference can be visualized using a cumulative histogram of the number of pixels at each color difference value.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

Figure 1:
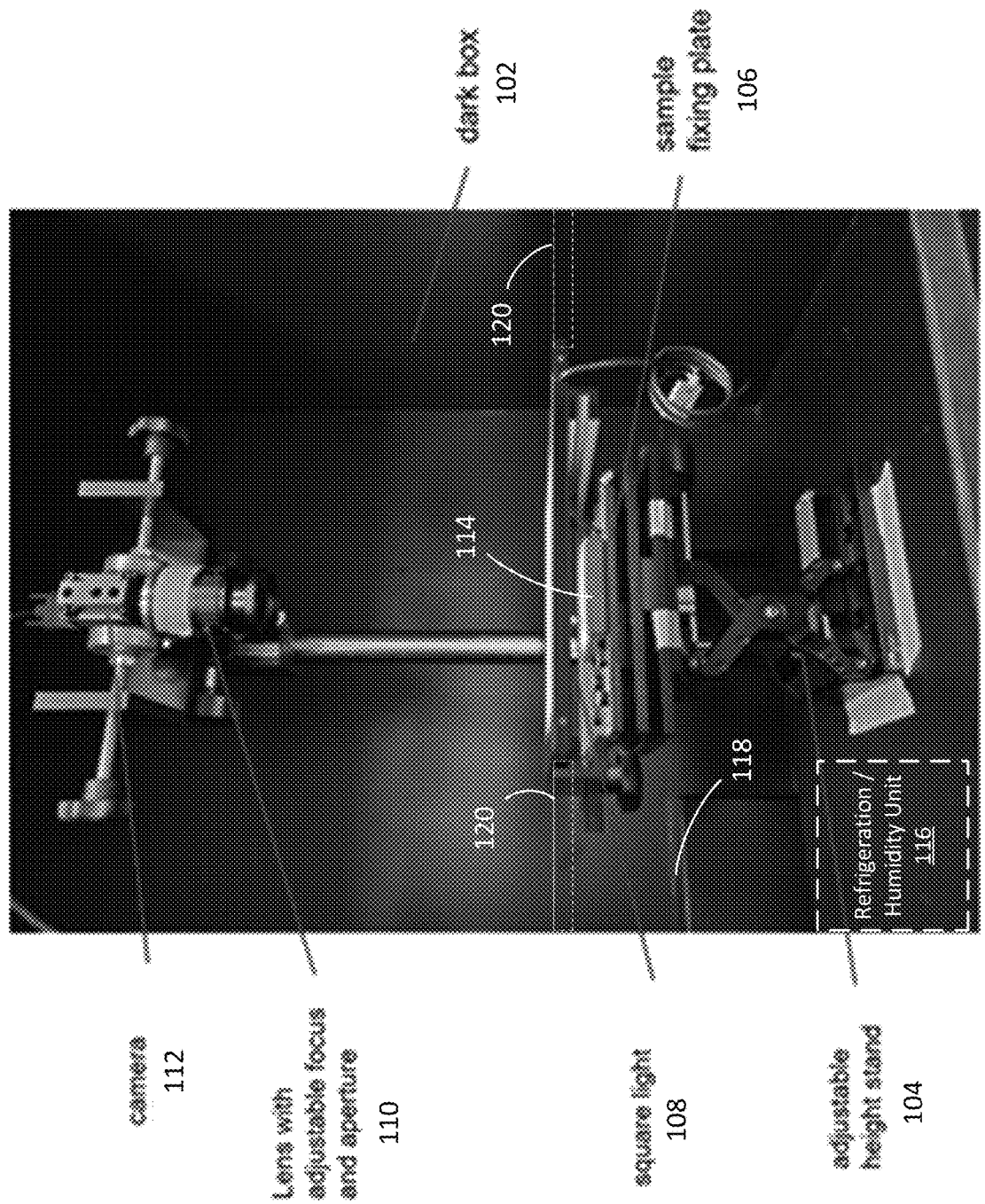
FIG. 1 is a high-level diagram of an apparatus for capturing consistent images of a standard product and sample product, according to an embodiment.

FIG. 1 is a high-level diagram of an apparatus for capturing consistent images of a standard product and sample product, according to an embodiment. A dark box (container) 102 is provided with a door (not shown) that can close so that all or almost all external light is excluded. The interior walls of the dark box 102 are black so that light is not reflected. Additionally, the interior walls may be textured to diffuse any reflected light.

An adjustable height stand 104 is mounted in dark box 102. A knob or knobs can be turned to adjust the height, and also adjust the product position in each of the x-y-z axes. Stand 104 supports a sample fixing plate 106 for holding the sample product. A square light 108 is mounted above the sample fixing plate. A camera 112 is mounted above the square light 108, with a lens 110 having an adjustable focus and aperture.

Since light intensity decreases as a square of the distance, square light 108 is mounted close to the sample product. In one embodiment, it is 1.2 cm from the product. Alternately, it can be between 0.5-2.5 cm above the sample product, or another distance depending upon the setup. As long as the images used for comparison are made with the same setup, a consistent distance between the square light and sample is achieved. The camera and lens positions are fixed so that the sample product will be in focus. In particular, the focus plane of the camera and the lens setup is fixed such that the sample product is in focus. Adjusting the aperture will cause unwanted effects in color evenness. The camera is attached to a separate, second height adjustable stand which can be used, if needed, for fine-tuning the focus. In embodiments, the focus and aperture rings on the lens are not adjusted. After calibrating the 2nd height adjustable stand attached to the camera, to make sure the focus plane is where the sample will be raised to, this 2nd height adjustment need not be adjusted again. Thus, the only part that needs to move after setup is the adjustable height stand, which is moved to bring the top of the sample product to within 1.2 cm of the square light. This can be done by inserting a 1.2 cm thick plate 114 between the sample product and the square light, and then adjusting the stand height until any gaps are eliminated. The plate is then removed.

Temperature affects the noise level on the CMOS sensor in the camera, which affects the color measurement. Since the color measurement accuracy varies due mainly to temperature and partly due to humidity, in one embodiment images are used only when both the standard and sample images have been white-calibrated with a standard white color tile. At a high level, color tile calibration works under the assumption that the color tile has a very consistent and stable color over time. By imaging the color tile along with the samples (or standard) in the same session, a reference point (color of the color tile) is created. Images of samples photographed in different sessions across days or months can then be "corrected" via the color of the color tile. In order to compare the color of sample 1 photographed on day A with the color of sample 2 photographed on day B, the color tile is photographed on both days. With the RGB values of the color tile on day A being Ra, Ga, Ba, and that of the same color tile on day B being Rb, Gb, Bb, the RGB values of sample 2 calibrated for day A, R_cal, G_cal, B_cal, are [R/(Ra−Rb)], [G/(Ga−Gb)], [B/(Ba−Bb)], respectively. Additionally, such a calibration allows the system to decrease the dEcmc (see discussion below) of the same color tile across multiple days to below 0.3, suggesting that variation caused by short term fluctuations of these factors is small, and results are repeatable. The average dEcmc of color tiles calculated from the difference between the color of images from day 1, and color of images from the coming 2 months has been found to fluctuate around 0.1 dEcmc. The standard deviation of the fluctuation in this 2 months is 0.05 dEcmc.

As shown in FIG. 1, the apparatus in one embodiment is composed of 2 dark boxes stacked on top of each other. The upper dark box is temperature and humidity controlled to minimize external environmental influences on the sensor of the camera. The 2 dark boxes are sealed off from each other, with the light source panel allowing the camera mounted in the top box to take an image of the sample mounted on the fixture system in the bottom box. In one embodiment, the apparatus is modular, with the stacked dark box being a container for whichever camera, light panel, fixture plate the user wants to use. For example, if the camera or light panel decays over time due to long term use, they can be easily exchanged for new by the user by removing mounting screws.

Alternately, or in addition, an optional refrigeration/humidity control unit 116 could be mounted below dark box 102, and provide air circulation through a vent 118. A temperature and humidity sensor (not shown) can be mounted inside dark box 102. In one embodiment, the chamber is divided in two, with a shelf 120 around square light 108 to isolate the temperature of the upper chamber from the lower chamber. The largest source of heat is typically the camera, and thus isolating it from the lower, sample product chamber reduces the effect of heat on the color measurement. Isolating the camera and controlling the temperature of the camera, controls the noise level on the camera sensor, thereby reducing the effect of heat on the color measurement. Shelf 120, and the walls of dark box 102, may be made of an insulating material. The box that is temperature controlled is double walled in one embodiment, with insulating material between metallic sheet walls. Alternately, or in addition, the camera sensor may be cooled with a thermoelectric cooler (TEC) or Peltier cooler.

Figure 2:
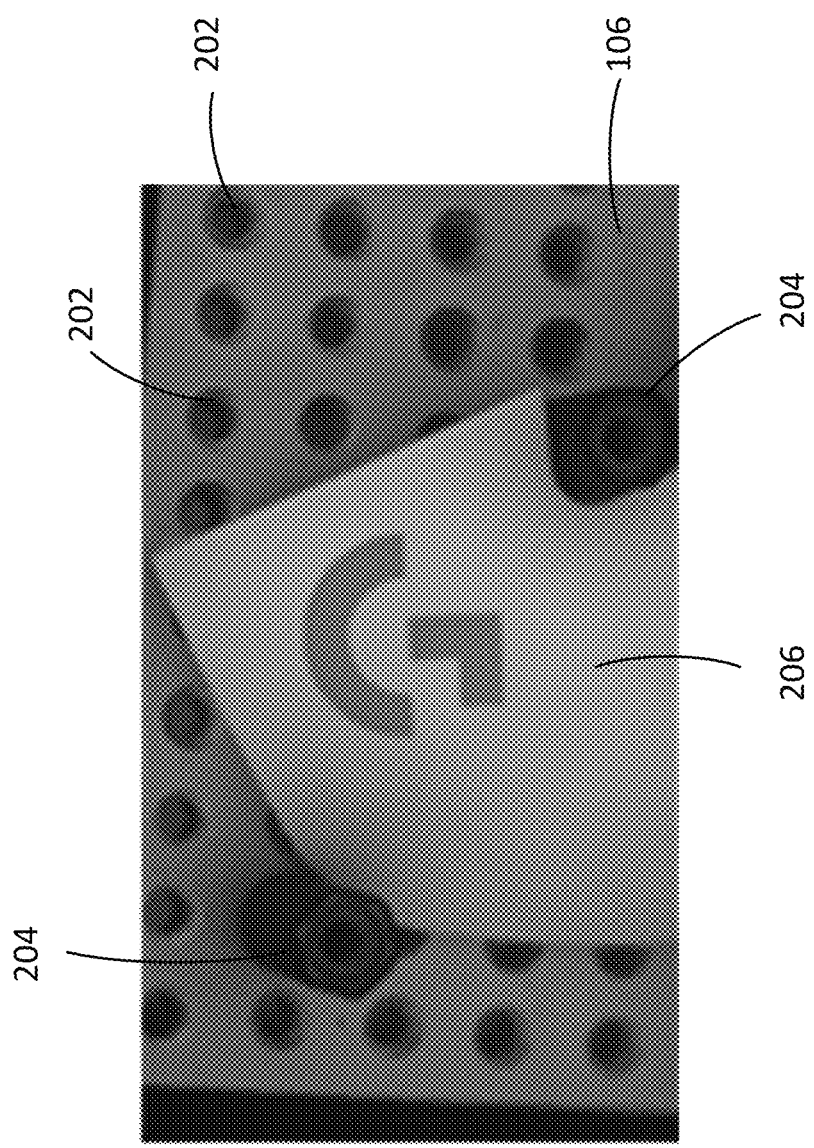
FIG. 2 is a diagram of a fixing plate according to an embodiment.

FIG. 2 is a diagram of a sample fixing plate 106 according to an embodiment. The fixing plate is a peg board with multiple peg holes 202 into which pegs 204 can be placed to hold a sample product 206. Alternately, a system of clamps could be used. In another embodiment, a different fixing plate can be designed for each product, with a unique shape to support the shape of the sample product. For example, a mouse or other peripheral device housing may have holes or pins in the bottom of the housing, and a fixing plate can be designed to engage those holes or pins.

FIGS. 3A & 3B are diagrams of prior art colorimeters. Traditional colorimeters usually illuminate the sample at an angle. This is illustrated in FIG. 3A, showing the setup of an entry level colorimeter. Light 303 from a light source 302 is reflected off a planar sample 306, and the indirect reflection is detected by a camera 304.

FIG. 3B shows the setup of a sphere spectrophotometer (an expensive solution described in more detail in the Background above). A light source 308 injects light into the sphere, with a detector 310 detecting the color of a planar sample 312. A light shield 314 prevents light from directly hitting planar sample 312, so that only indirect light hits planar sample 312. A light trap 316 is typically a tube for absorbing the linear component light to prevent it from being introduced to the detector 310, and is installed at the reflection side of the sphere.

Figure 4:
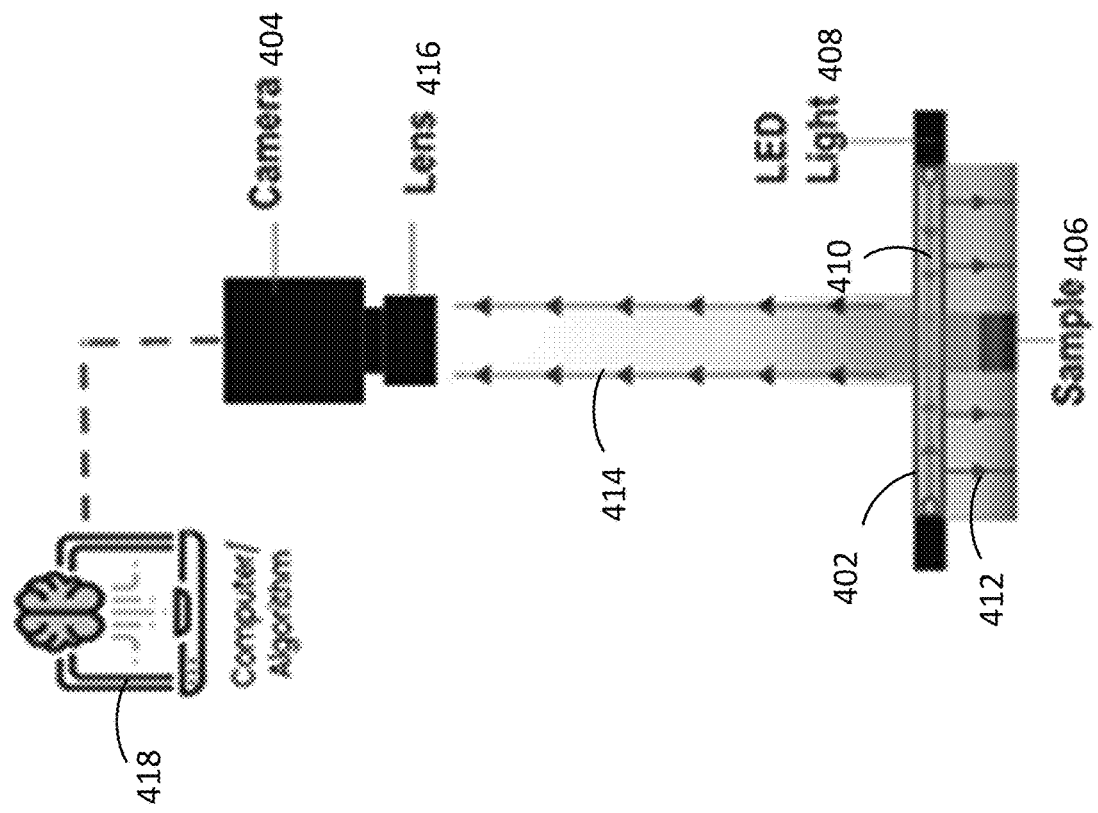
FIG. 4 is a diagram of a of a square light arrangement according to embodiments.

FIG. 4 is a diagram of a square light arrangement according to embodiments. A square light 402 is below a camera 404 and above a sample product 406. Square light 402 has LEDs 408 around the edges, pointing inward to emit light planar to the sample product as indicated by light emission arrows 410. Indirect lighting is then directed to the sample product, as indicated by arrows 412. The reflected light 414 is directed to camera 404 through a lens 416. The camera images are then provided to a computer 418 external to the dark box. Square lights are typically used for black and white inspection of flat products, such as inspection of circuit boards and semiconductor chips for defects. The present invention makes a novel use of a square light.

FIG. 5 is a flow chart illustrating the operation of the apparatus of FIG. 1, according to embodiments. A product is placed into the apparatus of FIG. 1, as described above, and is positioned to be a fixed distance below the square light. The dark box door is closed, and the temperature and humidity are optionally measured to ensure consistent conditions. Optionally, the temperature and humidity are adjusted using a refrigeration and humidity unit.

The camera then captures at least one image of the product (step 502). In one embodiment, the camera captures multiple images, and uses internal camera software to average each pixel to reduce the noise. For example, some camera capturing software (such as IC Capture 2.5), used along with The Imaging Source's DFK 33UX249, will average 32 images. In one embodiment, a Sony CMOS Pregius sensor (IMX249) is used with a resolution of 1,920×1,200 (2.3 MP) and a pixel size of 5.86 µm×5.86 µm.

In one embodiment, the camera applies a Bayer pattern. The Bayer pattern is a technique whereby instead of requiring each pixel to have its own individual three color planes (requiring 24 bits in total), an array of color filters is placed over the camera sensor and this limits the requirement for data bits per pixel to a single 8-bit byte (with a known color filter in place). The Bayer pattern is repeated over the image in a fixed configuration to standardize this process.

In an alternate embodiment, a multi-sensor prism camera is used for high accuracy color matching. Incoming light is split by a prism into separate channels for individual channel-specific sensors to detect. The benefits of a multi-sensor prism camera is that the effective resolution of the resulting image will not decrease. Thus, the CIE color-matching functions can be closely reproduced. CIE (Commission internationale de l'éclairage, in English International Commission on Illumination) sets forth a color matching system in accordance with an international model of human color vision. However, the inventors have found that a less expensive, standard Bayer-pattern image sensor produces similar results, although the decrease in effective resolution and light intensity causes the spectral sensitivity to deviate slightly from the CIE color-matching function.

In step 504, the image is cropped to a particular area of the product. The cropping is performed on the same area for the standard and sample products. In one embodiment, the image cropping extracts the region of image with the highest color consistency. This can be set up on the standard product by an operator selecting an area with a single color (of a multi-color product), an area which avoids printing or recesses or protrusions, or an area which avoids steep curvatures. The area cropped provides sufficient data to robustly detect the color, while limiting the amount of curvature or other color aberrations of the product. In one embodiment, the cropped area is 300×300 pixels=90,000 pixels. For the example camera described above, this is about 4% of the image. In alternate embodiments, the cropped area is between 1-10% of the captured image. In other embodiments, the cropped area represents about 5 cm² of the product, or between 1-10 cm².

In step 506, a portion of the cropped pixels are selected for processing. By selecting just a portion, the complexity of the processing and the amount of processing time required can be reduced. The cropping step selects the pixels at the center of the frame, in one embodiment 150 pixels up/down and left/right from the center pixel for a 300×300 image. This is done to select the pixels with colors closest to the true color, due to vignetting of the lens. This step does somewhat reduce noise, as the pixels outside this selected region deviate from the true color more than that of those within the region. The distribution of the pixels in RGB channels is modified by the cropping.

The pixels can be selected according to a random or pseudo-random algorithm, or a fixed pattern. The random sampling of the pixels reduces the number of pixels to reduce the required processing time. In one embodiment, 10,000 of 90,000 cropped pixels are selected, or about 11%. Alternately, between 5 and 25% of the pixels are selected. In one embodiment, the pattern of pixels used for the standard product is stored in memory and used for the same products, so that the same pattern of pixels is used for comparison between products of the same kind. In another embodiment, a random or pseudo-random algorithm is used each time, but with the same number of pixels.

In step 508, any outlier pixels beyond a user input color range are eliminated to further reduce noise effects. The color range is around the color of the standard product, and can have the thresholds of the range set by a variety of methods. Users may select samples that are a noticeably different color to the human eye, in both positive and negative directions along the color spectrum and/or luminance. Those selected samples can be imaged to produce thresholds. Pixels with a color beyond those thresholds are then eliminated. Alternately, the software can calculate a range and set a threshold based on input data indicating an acceptable deviation from the standard product color that is not typically noticeable by the human eye.

Histogram Algorithm

Figure 6B:
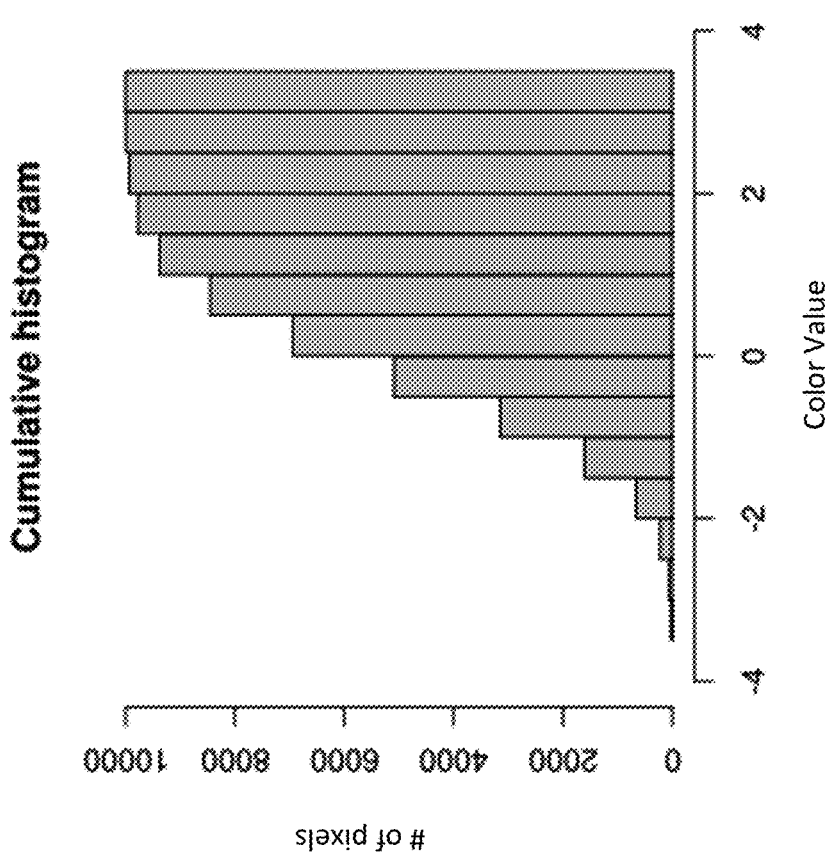
FIGS. 6A-B are diagrams of ordinary and cumulative histograms, respectively, according to embodiments.
Figure 6A:
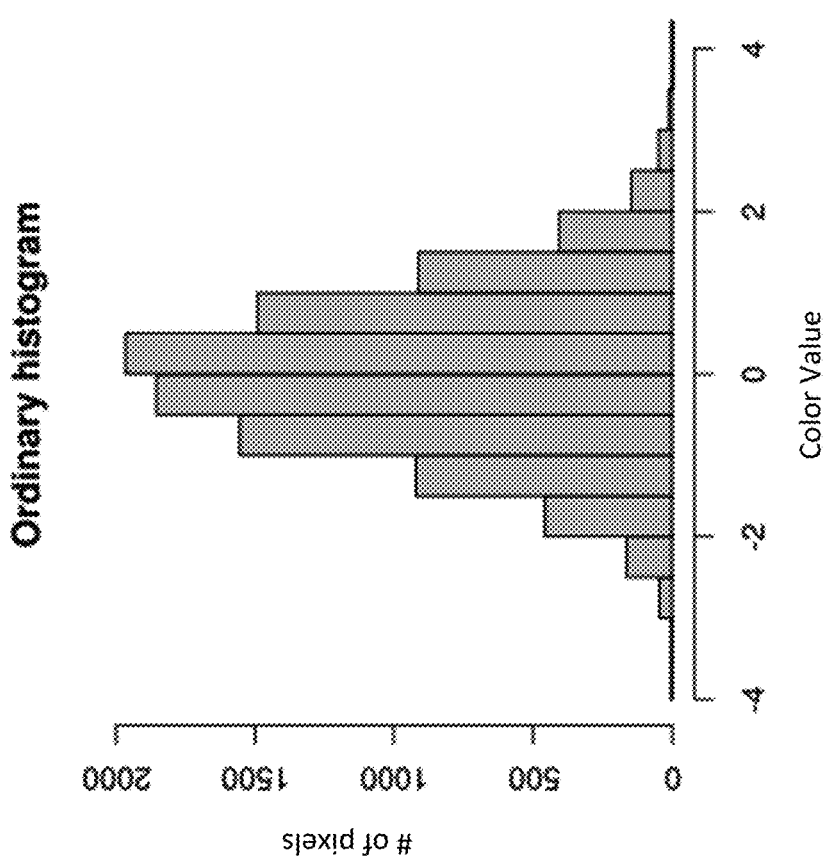

In step 510, the distribution of the number of pixels at a particular color value (y axis), for each color value (x axis) is recorded, and may be visualized with a histogram. An example is shown in FIG. 6A. In one alternate embodiment, the ordinary histogram is used, and the cumulative histogram step 512 is eliminated.

In step 512, for visualization purposes, a cumulative histogram is created of the number of pixels at a particular color value, for each color value. An example is shown in FIG. 6B. Alternately, the cumulative histogram is directly created, without first creating an ordinary histogram.

In step 514, the distributions of the sample product and standard products are compared. In one embodiment, all the sampled pixels are weighted equally (different from the standard color spectrophotometer and dEcmc calculation (see below) in the L-a-b color space, which calculate the point-wise difference between 2 data points), independent of their position in the color space and distance to the standard in the RGB color space. Given the expected cumulative distribution function $F_{exp}$ (standard sample distribution in this case), and the observed cumulative distribution function $F_{obs}$ (test sample distribution), the D-statistic $D_n$ (color difference) is calculated with the following formula:

$$D_n = \max_x |F_{exp}(x) - F_{obs}(x)| \qquad \text{Equation 1}$$

Wherein n is the count of pixels with the same color, and x is the color position along the cumulative histogram.

In simple terms, the D-statistic of the KS-test (Kolmogorov-Smirnov test), described in Equation 1, is a quantitative symmetric measurement of how different 2 distributions are from each other. Similar algorithms have been used in a different technology—for quickly comparing the colors of stored images for image search/retrieval and indexing systems. See, e.g., "Similarity of Color Images," Stricker and Orengo (1995). The challenges faced in these search and indexing applications are drastically different. Techniques for these search and indexing applications use content-based image retrieval (CBIR) algorithms that are often focused on reducing the computational complexity or dimension of the images and number of images.

Delta E CMC Algorithm

In an alternate embodiment, instead of using histograms, a Delta E CMC algorithm is used. This is a standard algorithm used to measure color difference, as is well-known by those of skill in the color art. Delta E CMC tolerancing is based on Delta L*C*H°, and is intended to provide agreement between human visual assessment and measured color difference. The CMC calculation mathematically defines an ellipsoid around the standard color with semi-axis corresponding to hue, chroma and lightness. CMC is not a color space but a color tolerance represented by a single numerical value, E. CMC is based on CIELCH where L is lightness, C is chroma, and H is hue. The CMC calculation defines an ellipsoid around the standard color while the volume of the ellipsoid represents acceptable color variation. Delta-E (dE) is a single number that represents the 'distance' between two colors. The idea is that a dE of 1.0 is the smallest color difference the human eye can see, and thus any dE greater than 1.0 is noticeable to the human eye.

The below describes a system which can provide the software control of the apparatus of FIG. 1 with a host computer.

System for Operating a Host Computing Device

Figure 7:
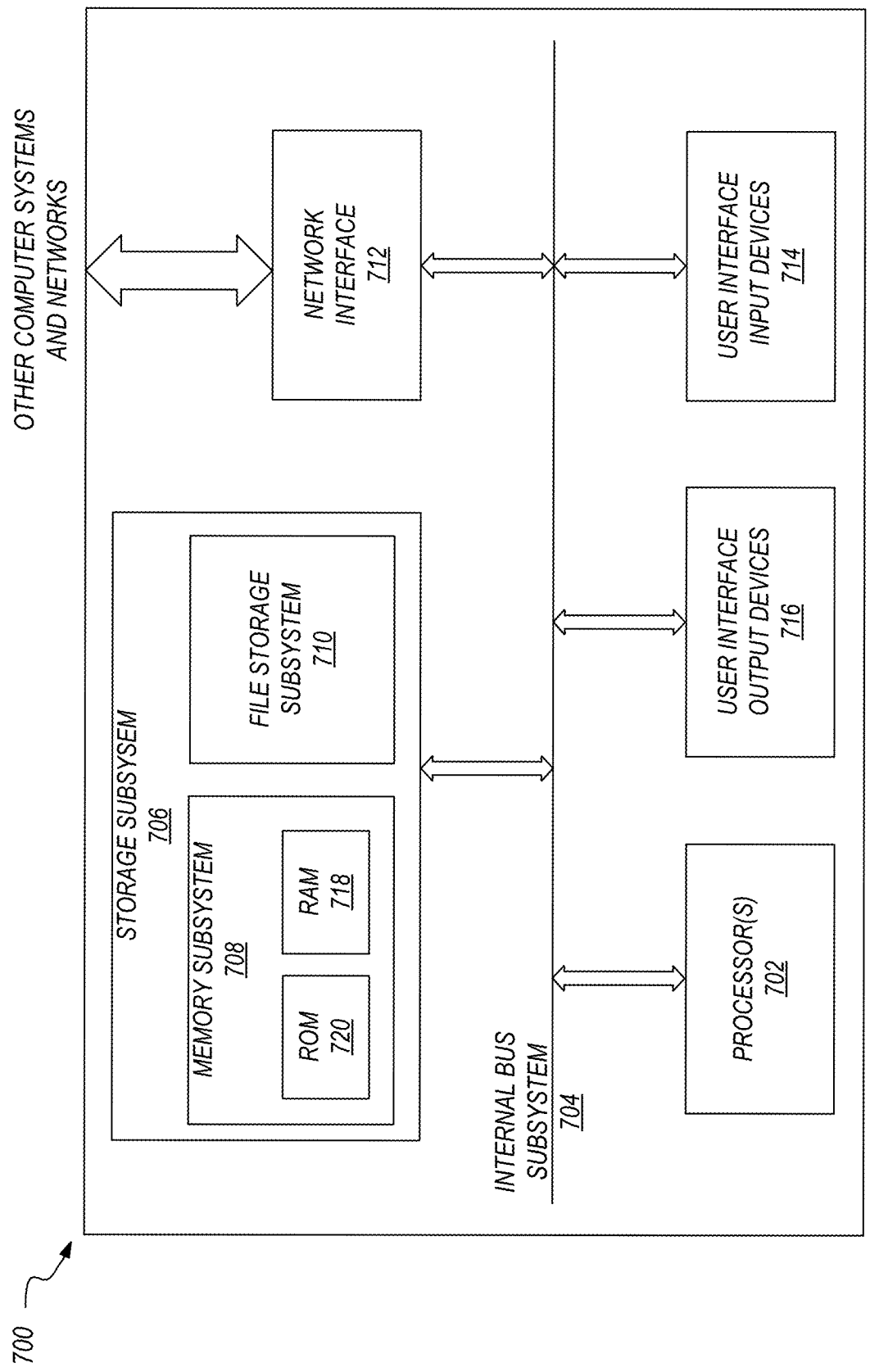
FIG. 7 shows is a simplified block diagram of a host computing device 700, according to certain embodiments.

FIG. 7 is a simplified block diagram of a host computing device 700, according to certain embodiments. Host computing device 700 can implement some or all functions, behaviors, and/or capabilities described above that would use electronic storage or processing, as well as other functions, behaviors, or capabilities not expressly described. Host computing device 700 can include a processing subsystem (processor(s)) 702, a storage subsystem 706, user interfaces 714, 716, and a communication interface 712. Computing device 700 can also include other components (not explicitly shown) such as a battery, power controllers, and other components operable to provide various enhanced capabilities. In various embodiments, host computing device 700 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 702 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 706 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 708 including random access memory (RAM) 718 such as dynamic RAM (DRAM), static RAM (SRAM), synchronous dynamic RAM (e.g., DDR), or battery backed up RAM or read-only memory (ROM) 720, or a file storage subsystem 710 that may include one or more code modules. In some embodiments, storage subsystem 706 can store one or more applications and/or operating system programs to be executed by processing subsystem 702, including programs to implement some or all operations described above that would be performed using a computer. For example, storage subsystem 706 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to system 700 and the method of FIG. 6, as well as any other implementations within the wide purview of the present disclosure. In some embodiments, aspects of the invention (e.g., the histogram algorithm) may be performed by software stored in storage subsystem 706. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 706 can also store information useful for establishing network connections using the communication interface 712.

Computer system 700 may include user interface input devices 714 elements (e.g., touch pad, touch screen, scroll wheel, click wheel, dial, button, switch, keypad, microphone, etc.), as well as user interface output devices 716 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 714 to invoke the functionality of computing device 700 and can view and/or hear output from computing device 700 via output devices of user interface 716.

Processing subsystem 702 can be implemented as one or more processors (e.g., integrated circuits, one or more single core or multi core microprocessors, microcontrollers, central processing unit, graphics processing unit, etc.). In operation, processing subsystem 702 can control the operation of computing device 700. In some embodiments, processing subsystem 702 can execute a variety of programs in response to program code and can maintain multiple concurrently executing programs or processes. At a given time, some or all of a program code to be executed can reside in processing subsystem 702 and/or in storage media, such as storage subsystem 704. Through programming, processing subsystem 702 can provide various functionality for computing device 700. Processing subsystem 702 can also execute other programs to control other functions of computing device 700, including programs that may be stored in storage subsystem 704.

Communication interface (also referred to as network interface) 712 can provide voice and/or data communication capability for computing device 700. In some embodiments, communication interface 712 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 712 can provide wired connectivity (e.g., universal serial bus (USB), Ethernet, universal asynchronous receiver/transmitter, etc.) in addition to, or in lieu of, a wireless interface. Communication interface 712 can be implemented using a combination of hardware (e.g., driver circuits, antennas, modulators/demodulators, encoders/decoders, and other analog and/or digital signal processing circuits) and software components. In some embodiments, communication interface 712 can support multiple communication channels concurrently.

User interface input devices 714 may include any suitable computer peripheral device (e.g., computer mouse, keyboard, gaming controller, remote control, stylus device, etc.), as would be appreciated by one of ordinary skill in the art with the benefit of this disclosure. User interface output devices 716 can include display devices (e.g., a monitor, television, projection device, etc.), audio devices (e.g., speakers, microphones), haptic devices, etc. Note that user interface input and output devices are shown to be a part of system 700 as an integrated system. In some cases, such as in laptop computers, this may be the case as keyboards and input elements as well as a display and output elements are integrated on the same host computing device. In some cases, the input and output devices may be separate from system 700. One of ordinary skill in the art with the benefit of this disclosure would appreciate the many modifications, variations, and alternative embodiments thereof.

It will be appreciated that computing device 700 is illustrative and that variations and modifications are possible. A host computing device can have various functionality not specifically described (e.g., voice communication via cellular telephone networks) and can include components appropriate to such functionality. While the computing device 700 is described with reference to particular blocks, it is to be understood that these blocks are defined for convenience of description and are not intended to imply a particular physical arrangement of component parts. For example, processing subsystem 702, storage subsystem 706, user interfaces 714, 716, and communications interface 712 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 700.

Some embodiments may utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Alternate Embodiments

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An apparatus for comparing a color of a first product to a second product, comprising:
    a closed container which reduces external light by at least 90 percent;
    a fixture mounted in the closed container and configured to position the first product and at a separate time the second product at the same orientation and height;
    a camera mounted in the closed container above the fixture;
    a planar light source mounted in the closed container between the camera and the fixture for projecting light in a plane normal to a line between the camera and the first or second product;
    a processor; and
    non-transitory computer media containing instructions for execution by the processor for
        selecting a portion of an image of the first and second products; and
        comparing a portion of an image of the first product to the portion of the image of the second product to determine when the color of the second product is within a predetermined range of the color of the first product.

2. The apparatus of claim 1 wherein the planar light source has an interior transparent plate window for allowing the camera to view the first and second products, and light sources mounted in a perimeter frame that project light laterally into the window.

3. The apparatus of claim 1
    further comprising a shelf around the planar light source to isolate the temperature of an upper chamber of the closed container from a lower chamber.

4. The apparatus of claim 1 wherein the non-transitory computer media further contains instructions for:
    cropping the image to the same portion of the first product and the second product; and
    selecting a subset of pixels of a cropped image.

5. The apparatus of claim 4 wherein the non-transitory computer media further contains instructions for:
comparing pixel color values to a user set range and discarding pixels outside the user set range to reduce noise effects.

6. The apparatus of claim 1 wherein the non-transitory computer media further contains instructions for:
comparing a distribution of a count of pixels with each of a plurality of color values versus the plurality of color values for the portion of the image of the first product and the portion of the image of the second product.

7. The apparatus of claim 1 wherein the non-transitory computer media further contains instructions for:
calculating a delta "E" (dE) of a CMC color tolerance algorithm for pixels of the first product compared to corresponding pixels of the second product; and
determining whether dE is less than 1.0, corresponding to the smallest color difference the human eye can see.

8. The apparatus of claim 1 wherein the camera and planar light source are mounted a fixed distance apart, and further comprising:
an adjustable platform for vertically moving the fixture so that different products are the same distance below the planar light source.

9. An apparatus for comparing a color of a standard product to a sample product, comprising:
a closed container which reduces external light by at least 90 percent;
a fixture mounted in the closed container and configured to position the standard product and at a separate time the sample product at the same orientation and height;
a camera mounted in the closed container above the fixture;
a planar light source mounted in the closed container between the camera and the fixture for projecting light in a plane normal to a line between the camera and the sample product, wherein the planar light source has an interior transparent plate window for allowing the camera to view the sample product, and light sources mounted in a perimeter frame that project light laterally into the window;
a shelf around the planar light source to isolate the temperature of an upper chamber of the closed container from a lower chamber;
a processor; and
non-transitory computer media containing instructions for execution by the processor for
cropping an image of the sample product to the same portion of the standard product and the sample product, producing a cropped image,
selecting a subset of the cropped image,
comparing pixel color values to a user set range and discarding pixels outside the user set range to reduce noise effects; and
comparing a distribution of a count of pixels with each of a plurality of color values versus the plurality of color values for the portion of the image of the standard product and the portion of the image of the sample product to determine when the color of the sample product is within a predetermined range of the color of the standard product;
wherein the comparing uses the following formula:

$$D_n = \max_x |F_{exp}(x) - F_{obs}(x)|,$$

where $D_n$ is the color difference, $F_{exp}$ is a standard sample distribution, $F_{obs}$ is a test sample distribution, n is a count of pixels with the same color, and x is a color position.

10. The apparatus of claim 9 wherein the cropped image is between 1-10% of the image of the first or second product.

11. The apparatus of claim 9 wherein the subset of the cropped image is between 5-25% of the pixels of the cropped image.

12. The apparatus of claim 11 wherein the subset of the cropped image is selected by a random or pseudo-random algorithm.

13. The apparatus of claim 1 further comprising a focusing lens mounted on the camera.

14. A method for comparing a color of a first product to a second product, comprising:
placing the first product, and, at a separate time, the second product, in a closed container which reduces external light by at least 90 percent;
orienting the first product and at the separate time the second product at the same orientation and height;
projecting light in a plane normal to a line between a camera and the first or second product;
capturing an image of the first product, and, at the separate time, the second product;
selecting a portion of the image of the first and second products; and
comparing the portion of the image of the first product to the portion of the image of the second product to determine when the color of the second product is within a predetermined range of the color of the first product, wherein the comparing uses the following formula:

$$D_n = \max_x |F_{exp}(x) - F_{obs}(x)|,$$

where $D_n$ is the color difference, $F_{exp}$ is a standard sample distribution, $F_{obs}$ is a test sample distribution, n is a count of pixels with the same color, and x is a color position.

15. The method of claim 14 further comprising:
cropping the image to the same portion of the first product and the second product.

16. The method of claim 15 further comprising:
selecting a subset of a cropped image.

17. The method of claim 16 further comprising:
comparing pixel color values to a user set range and discarding pixels outside the user set range.

18. The method of claim 17 wherein:
the cropped image is between 1-10% of the image of the first or second product;
the subset of the cropped image is between 5-25% of the pixels of the cropped image; and
the subset of the cropped image is selected by a random or pseudo-random algorithm.

19. The method of claim 14 further comprising:
comparing a distribution of a count of pixels with each of a plurality of color values versus the plurality of color values for the portion of the image of the first product and the portion of the image of the second product.

20. The method of claim 14 further comprising:
calculating dEcmc a delta "E" (dE) of a CMC color tolerance algorithm for pixels of the first product compared to corresponding pixels of the second product.

* * * * *